US007839879B2

(12) United States Patent
Trasi et al.

(10) Patent No.: US 7,839,879 B2
(45) Date of Patent: Nov. 23, 2010

(54) METHOD AND SYSTEM FOR SUPPORTING CROSS CLUSTER EXTENSION MOBILITY IN INTERNET-PROTOCOL TELEPHONY

(75) Inventors: Atul Trasi, Potomac Falls, VA (US); Daniel Scott Keller, San Jose, CA (US); Susan Marie Sauter, Murphy, TX (US); Ho Bao, Richardson, TX (US); Chunfeng Huang, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 902 days.

(21) Appl. No.: 11/675,739

(22) Filed: Feb. 16, 2007

(65) Prior Publication Data

US 2008/0186963 A1    Aug. 7, 2008

Related U.S. Application Data

(60) Provisional application No. 60/887,787, filed on Feb. 1, 2007.

(51) Int. Cl.
*H04L 12/28* (2006.01)
(52) U.S. Cl. .................... 370/420; 370/395.5; 370/466; 370/468
(58) Field of Classification Search .............. 370/395.5, 370/395.52, 420, 466, 469
See application file for complete search history.

(56) References Cited

U.S. PATENT DOCUMENTS

| 5,999,525 | A | | 12/1999 | Krishnaswamy et al. |
| 6,098,094 | A | * | 8/2000 | Barnhouse et al. .......... 709/203 |
| 6,687,360 | B2 | * | 2/2004 | Kung et al. ............. 379/211.02 |
| 7,149,297 | B2 | * | 12/2006 | Idoni et al. ............. 379/201.02 |
| 7,151,825 | B2 | * | 12/2006 | Idoni et al. ............. 379/201.02 |
| 7,227,942 | B2 | * | 6/2007 | Deo et al. .................... 379/219 |
| 7,289,619 | B2 | * | 10/2007 | Vivadelli et al. ....... 379/212.01 |
| 2002/0064149 | A1 | | 5/2002 | Elliott et al. |
| 2004/0264664 | A1 | * | 12/2004 | Idoni et al. ............. 379/201.01 |
| 2004/0264665 | A1 | * | 12/2004 | Idoni et al. ............. 379/201.01 |
| 2006/0033809 | A1 | | 2/2006 | Farley |
| 2008/0109289 | A1 | * | 5/2008 | Vivadelli et al. ............... 705/7 |

OTHER PUBLICATIONS

Cisco Systems, Inc. Cisco CallManager Features and Services Guide, Chapter I—Cisco CallManager Extension Mobility, Release 5.0(1), San Jose, California, 2006.

* cited by examiner

*Primary Examiner*—Pankaj Kumar
*Assistant Examiner*—Mark A Mais
(74) *Attorney, Agent, or Firm*—Marger Johnson & McCollom, P.C.

(57) ABSTRACT

A method to support cross cluster extension mobility (CCEM) in a communication network, which includes a plurality of clusters, each of the plurality of clusters including a call manager, the method includes receiving a request for cross cluster extension mobility from a user on a first telephony device located in a first cluster; adding a second telephony device in a home cluster for the user, only if the first cluster is different from the home cluster. The method further includes performing extension mobility login for the user on the first telephony device; and configuring a Trivial File Transfer Protocol (TFTP) service parameter of the call manager in the first cluster.

21 Claims, 8 Drawing Sheets

100

200

200

METHOD AND SYSTEM FOR SUPPORTING CROSS CLUSTER EXTENSION MOBILITY IN INTERNET-PROTOCOL TELEPHONY

RELATED APPLICATION DATA

This application claims the benefit of U.S. Provisional Application Ser. No. 60/887,787, filed 1 Feb. 2007, incorporated herein by reference.

TECHNICAL FIELD

The present disclosure relates generally to the field of telecommunications, and more specifically to a method and system for supporting Cross Cluster Extension Mobility (CCEM) in Internet Protocol (IP) telephony.

BACKGROUND

Many enterprises have more employees than desks in certain locations. The explanation may be due to a large sales force, many of whom visit the physical office only rarely. It is increasingly important for companies to save cost by not tying up square footage when the employees are elsewhere, especially for companies with sales personnel in high-rent districts. To make desk-sharing practical, a desirable solution is for employees to keep their personal phone extensions even if they use one desk one day and another the next-possibly in different cities. To ensure productivity, employees would also need access to their own telephony feature sets, such as speed-dial numbers and services like Follow-Me, Personal Assistant, and others.

IP telephony is a fast growing application providing low cost communication with others. Because of the integration of IP telephony devices and data networks (e.g., Internet), many innovative features may be possible for users of Voice over IP (VoIP) that have not been available to users of traditional telecommunication networks (e.g., Public Switched Telephone Network).

One such notable feature is Cisco's Extension Mobility, a built-in feature of Cisco Unified CallManager (CUCM). CUCM tracks all active VoIP network components, which include phones, gateways, conference bridges, transcoding resources and voicemail boxes among others. Extension Mobility allows a user to log onto any Extension Mobility-enabled IP phone (e.g., Cisco IP phone 7960) with a user ID and PIN and to transfer his user profile to that phone. It allows the user to configure the Extension Mobility-enable IP phone as his own, on a temporary basis, with line numbers, speed dials, services, permissions, and other user-specific properties. However, only those IP phones served in a single CUCM cluster may participate in Extension Mobility (a cluster may serve a single building or multiple offices across several cities). In other words, the Extension Mobility feature does not allow users to traverse different clusters within a network.

Therefore, there is a need for an IP phone service which can provide seamless mobility across multiple clusters within the enterprise data network domain.

DESCRIPTION OF EXAMPLE EMBODIMENTS

Overview

A method is provided to support cross cluster extension mobility (CCEM) in a communication network, which includes a plurality of clusters, each of the plurality of clusters including a call manager. The method includes receiving a request for cross cluster extension mobility from a user on a first telephony device located in a first cluster; adding a second telephony device in a home cluster for the user, only if the first cluster is different from the home cluster. The method can further include performing extension mobility login for the user on the first telephony device; and configuring a Trivial File Transfer Protocol (TFTP) service parameter of the call manager in the first cluster.

A system for supporting cross cluster extension mobility (CCEM) in a communication network includes a first telephony device in a first cluster operable to receive a user input; and to communicate the user input over the communication network. The system further includes an application server coupled to the communication network, the application server including a CCEM service application operable to perform extension mobility login for the user on the first telephony device. A call manager in the first cluster includes a TFTP service, which is configurable to include alternate file location for all other clusters in the communication network.

BRIEF DESCRIPTION OF THE DRAWINGS

The foregoing and other objects, advantages and features will become more readily apparent by reference to the following detailed descriptions in conjunction with the accompanying drawings.

DESCRIPTIONS

Figure 1:
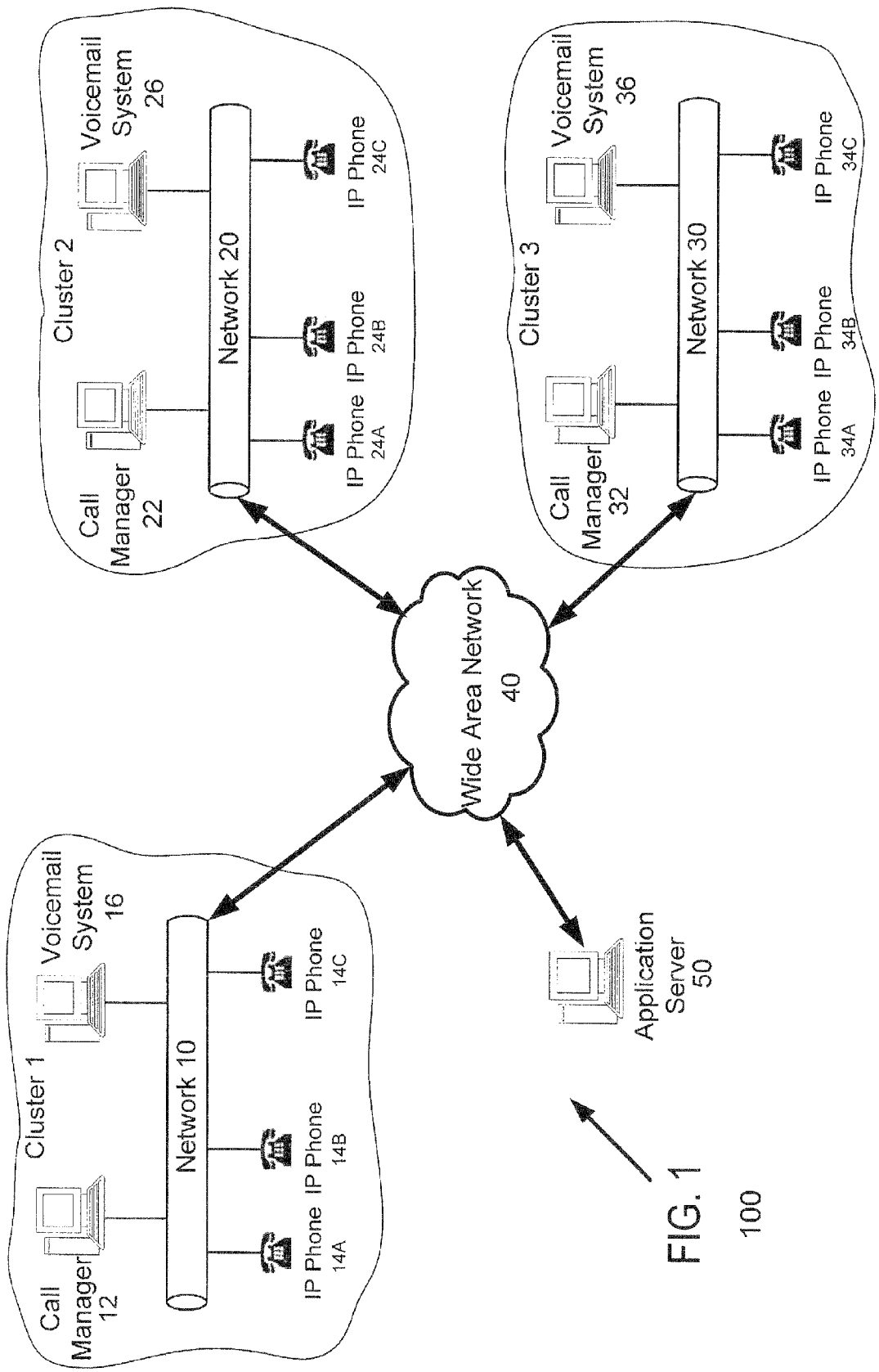
FIG. 1 is a schematic block diagram illustrating an example communication network for supporting Cross Cluster Extension Mobility (CCEM).

FIG. 1 is a schematic block diagram illustrating an example communication network 100 for supporting Cross Cluster Extension Mobility (CCEM).

Referring to FIG. 1, communication network 100 includes a plurality of clusters 1, 2, and 3 interconnected via a wide area network (WAN) 40. Communication network 100 may include more than three clusters. Each cluster 1, 2, and 3 is served by a call manager 12, 22, and 32, and further includes a plurality of IP telephony devices 14, 24, and 34, as well as a voice mail system 16, 26, 36. Each of the above described components in a cluster is coupled to a computer data network operable to transmit audio and/or video signals. Computer data networks 10, 20, and 30 may be any type of network that allows the transmission of audio and/or video signals, as well as traditional data communications. In communication network 100 illustrated in FIG. 1, networks 10, 20, and 30 are IP networks. Telecommunication signals can be transmitted between any of the device or network component located in any of the clusters. For example, IP telephony devices 14A, 14B, and 14C are coupled to network 10 to allow such communication over other clusters in communication network 100.

IP telephony devices 14, 24, and 34 include telephones, fax machines, computers running telephony software (i.e., softphone), or any other device capable of performing telephony functions over an IP network. Each IP telephony device is a node on the network and has its own IP address and Media Access Control (MAC) layer address.

Each call manager 12, 22, and 32 manages IP telephony devices 14, 24, and 34 within each of the cluster. For example, call manager 12 manages device 14A, 14B, and 14C and IP calls made over network 10 in cluster 1, which may include call processing, routing, telephone features and options (such as call hold, call transfer, and caller ID), device configuration, and other telephony functions and parameters. A suitable example of call manager 12 is Cisco Unified CallManager (CUCM) 4.0 and higher.

Communication network 100 further includes application server 50 which is coupled to WAN 40. Application server 50 may be configured to host various IP telephony applications, such as mobility, recording, paging, conferencing, speech-enabled applications, IP phone services, and other voice and data-converged applications. Application server 50 may be located anywhere in communication network 100; for example, it may be located in one of the clusters.

Figure 2A:
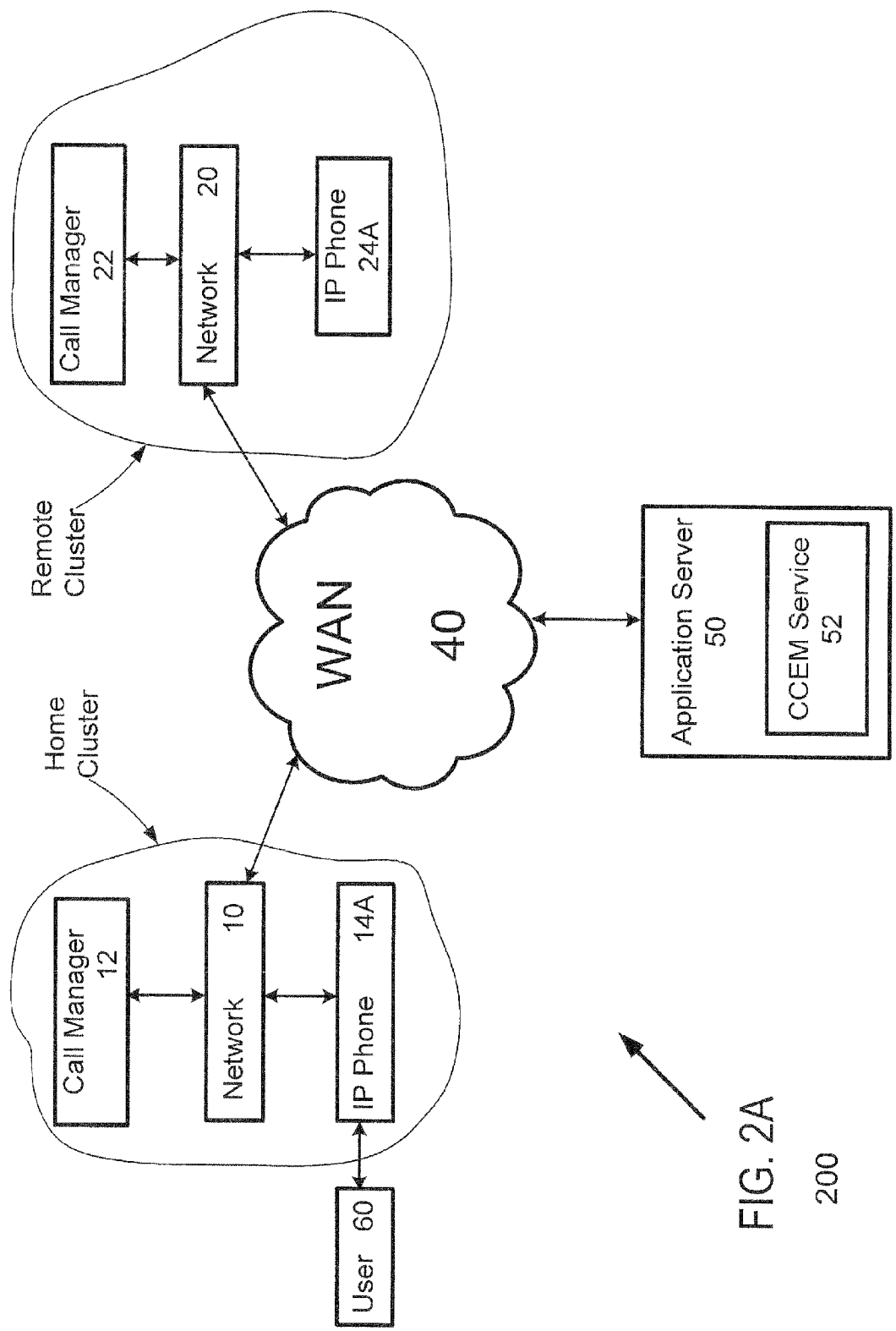
FIG. 2A is a schematic block diagram illustrating an example system for supporting CCEM in the communication network of FIG. 1.
Figure 2B:
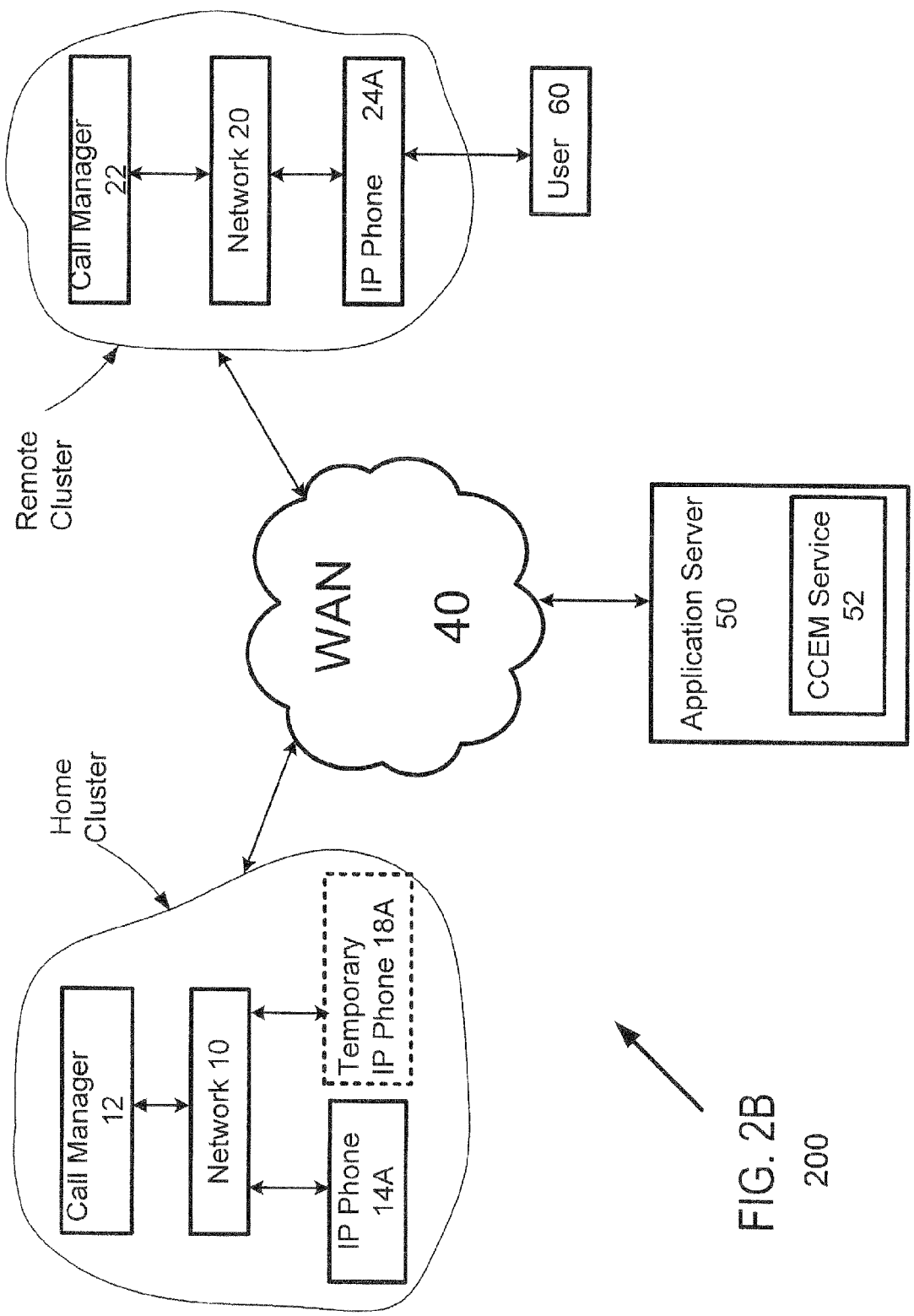
FIG. 2B is a schematic block diagram illustrating an example system for supporting CCEM in the communication network of FIG. 1.

FIGS. 2A & 2B are the schematic block diagrams illustrating example systems for supporting CCEM in the communication network of FIG. 1.

System 200 is an instance of the communication network 100 of FIG. 1, which includes a home cluster and a remote cluster, connected via WAN 40. From the perspective of a user, the home cluster is the user's home, while the remote cluster is the cluster that the user is temporarily visiting. As such, the designation of "home" and "remote" is relative to each other. The home cluster may be determined using a unique user ID and/or directory number. The user may provide further details on how to compute his home cluster based on the user ID. The user is associated with a user device profile, which is stored in his home cluster call manager's database. The user device profile defines various telephony features configured for the particular user, such as his local directory numbers, subscribed service, speed dials, voice mail profile and others. For example, a user who is associated with the Europe cluster and visiting Asia will be able to go up to a phone that has the CCEM service enabled and to log on. As such, most features available to the user in his home cluster, Europe in this case, will be available in the remote cluster, Asia.

Referring to FIGS. 2A & 2B, user 60 wants to invoke CCEM service. User 60 may request service by pressing a button on IP telephony device 14A in his home cluster, if he is in the home cluster; or if he is in the remote cluster, he may press a button on IP telephony device 24A in the remote cluster. IP telephony devices 14A and 24A are both configured to support extension mobility service. This action in turn invokes a Uniform Resource Locator (URL) for CCEM service 52 residing in application server 50. CCEM service 52 is an IP phone service which, among other things, performs the extension mobility login and logout for a user in his home cluster as well as in any of the remote clusters. The login and logout process will be described later in association with FIGS. 3 and 4. CCEM service 52 may be implemented in software, firmware, or any suitable combination thereof. One example implementation of CCEM service 52 is based on Cisco Unified Application Development Environment (CUAE) Platform.

Based on this URL, the user's request is sent to CCEM service 52 via WAN 40. In response to the request, CCEM service 52 prompts user 60 for user ID and PIN. If the use ID is valid, CCEM service 52 would first determine if user 60 logs in from a phone device in a remote cluster or from his home cluster.

If user 60 logs in from his home cluster using device 14A, such as in FIG. 2A, then CCEM service 52 performs local extension mobility login on the device. If the login is successful, device 14A will restart with the user's device profile (e.g., his speed-dial numbers, phone template, subscribed service, and others).

On the other hand, if user 60 logs in from the remote cluster using device 24A, such as in FIG. 2B, CCEM service 52 first obtains the remote logged-in device information, such as device 24A's MAC address and its phone type. For example, the MAC address for device 24A may be 0x123456789abc.

CCEM service 52 also creates a temporary IP telephony device 18A in the user's home cluster with the same device name as the remote logged-in device 24A, such as SEP 123456789abc, and configures the temporary device 18A to support extension mobility service. The creation of temporary phone device 18A on user's home cluster generates a configuration file in the database of call manager 12. The configuration file defines the attributes of device 18A, such as its phone template, user locale, subscribed service, and speed dials. This configuration file is associated with device 18A, which may be identified by its device name SEP123456789abc.

In addition, CCEM service 52 will also change the original name of the remote logged-in device 24A to some other name. For example, the name of device 24A may be changed from SEP123456789abc to SEPCCC456789abc by replacing the first three characters of its original name with 'CCC'. This change of name would prevent device 24A from finding its configuration file stored in the remote cluster and instead would cause the configuration file to be found on the user's home cluster. This is because the temporary device 18A in user's home cluster has adopted the original name of the remote logged-in device 24A.

Once device 18A has been created on user's home cluster using the original name of the remote logged-in device 24A and the name of the remote logged-in device 24A has been changed to some other name on the remote cluster, CCEM service 52 may now perform local extension mobility login for temporary device 18A located in user's home cluster.

Upon successful login, device 24A may request transfer of its configuration file via TFTP. Device 24A may first request the files from its home cluster call manager's local TFTP path, which is call manager 22 in the remote cluster. Device 24A will not be able to find the file in its call manager's local TFTP path in the remote cluster, because by changing device 24A's name from SEP 123456789abc to SEPCCC456789abc, this new name no longer matches the local configuration file stored in call manager 22. Instead the configuration file is stored on user's home cluster call manager 12's local TFTP path when device 18A is created on user's home cluster. This situation may be solved by configuring the TFTP service parameters in call manager 22 to include alternative file locations for all the other call manager clusters' TFTP servers. This is how a phone on one cluster will be able to find its configuration file on another cluster, using the information configured in the alternative TFTP path. In other words, the alternate TFTP path says if you can't find the file locally; also check these other alternate locations. The details on how to configure the call manager to include alternative file location will be described later in association with FIG. 5.

The benefits of CCEM feature implemented in systems 200A & B may be best summarized as the following:

User logs into his cluster seamlessly from anywhere within an enterprise coverage;

User experience is as if he is at his physical phone in his home cluster;

User has his local number, speed dials, IP services;

There is no need to learn the local dial plan;

Minimum development effort.

Figure 3:
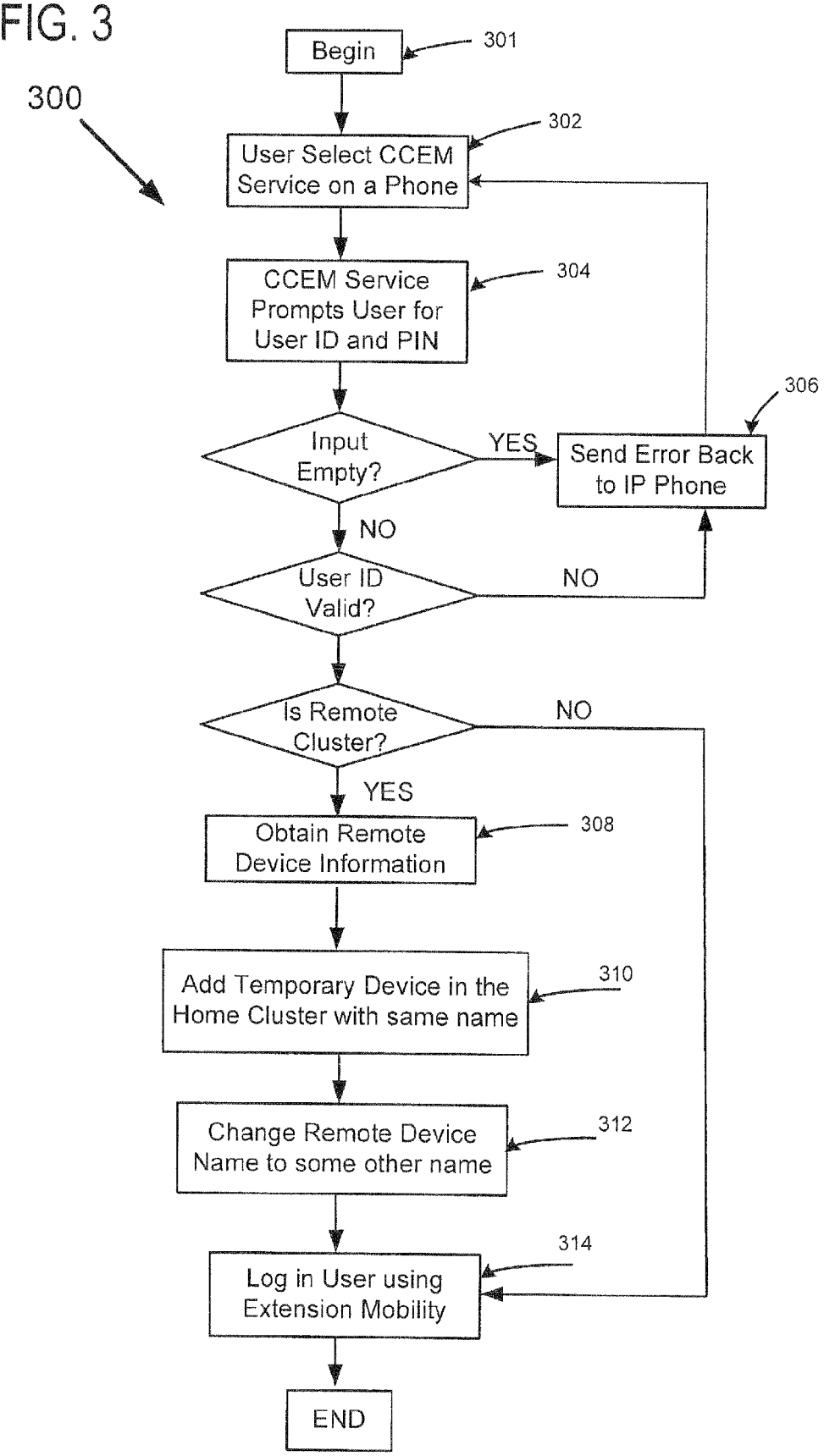
FIG. 3 is a flow chart illustrating an example login process for CCEM in the example system of FIGS. 2A & 2B.

FIG. 3 is a flow chart illustrating an example login process 300 performed by CCEM service 52 in the example system of FIG. 2.

Process 300 begins at step 301. At step 302, a user selects CCEM service (e.g., by pressing a button on an IP telephony device). At step 304, CCEM service 52 prompts user for user ID and PIN. If the user ID is not valid or the user simply fails to enter any input, then an error message is sent to the logged-in phone at step 306. Otherwise if the user ID is valid, CCEM service 52 will determine if the user logs in from a remote cluster or from his home cluster. As mentioned earlier, home cluster may be determined using user ID, or any other suitable means well-known in the field. If the user logs in from his home cluster, then CCEM service 52 performs a local extension mobility login at step 314.

Otherwise if the user logs in from a phone device in the remote cluster, CCEM service 52 first obtains device information, such as the MAC address (e.g., xxxxxxxxxxxx), as well as the phone type (e.g., Cisco IP phone 7960) at step 308. At step 310, CCEM service 52 creates a temporary device in the user's home cluster with a device name, such as SLPxxxxxxxxxxxx, such that the name of the temporary device in user's home cluster is the same as the original device name of the remote logged-in phone in the remote cluster. At step 312, CCEM service 52 changes the device name of the logged-in phone in the remote cluster to some other name, e.g., from SEPxxxxxxxxxxxx to SEPCCCxxxxxxxxx. At step 314, CCEM service 52 may perform local extension mobility login for the user in the remote cluster.

If the login is successful, the logged-in phone will restart with the user's device profile, such as his local number, IP service, and speed dials.

Figure 4:
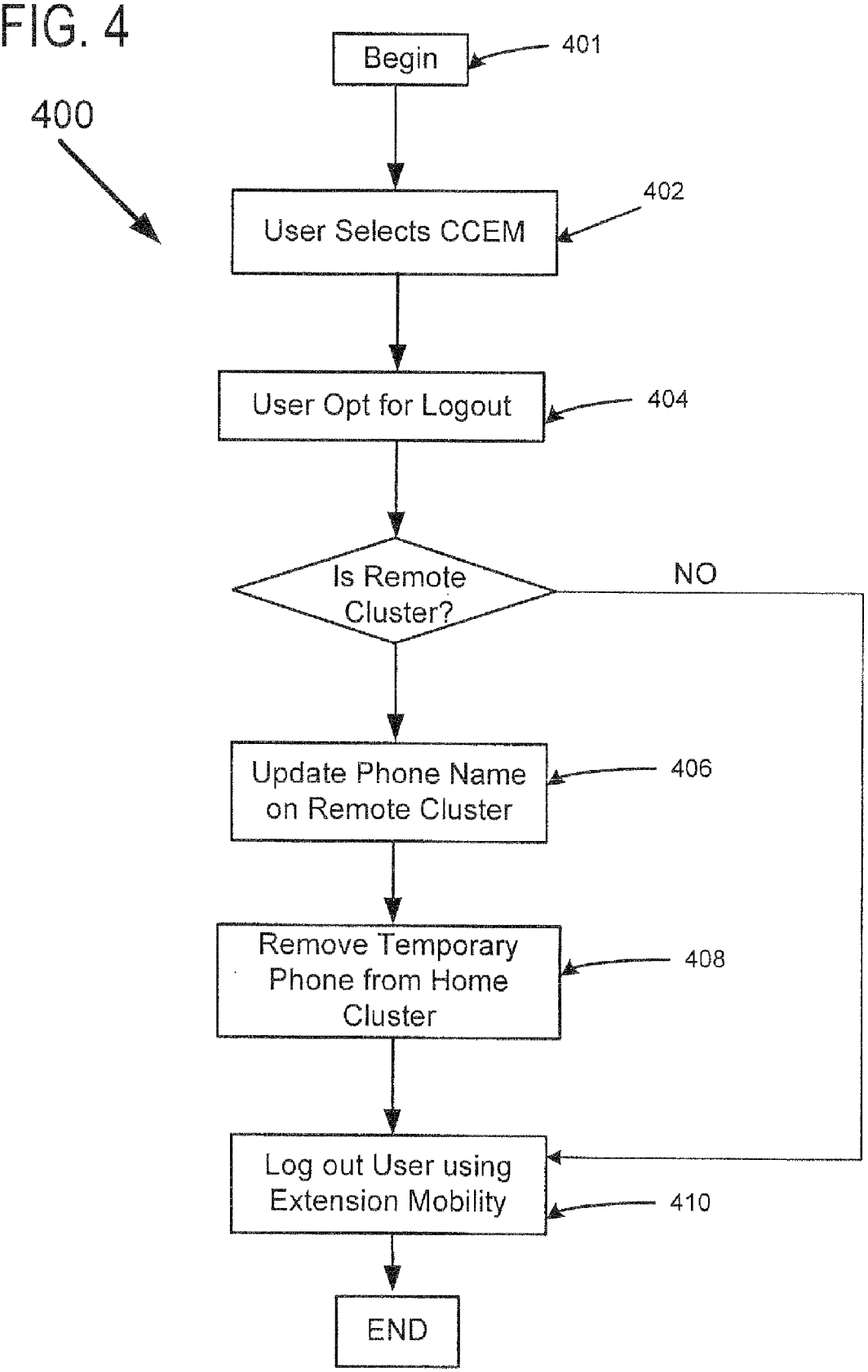
FIG. 4 is a flow chart illustrating an example logout process for CCEM in the example system of FIGS. 2A & 2B.

FIG. 4 is a flow chart illustrating an example logout process 400 performed by CCEM service 52 in the example system of FIG. 2.

Process 400 begins at step 401. At step 402, the user selects CCEM service. At step 404, the user opts for logout. If the user is in his home cluster, then CCEM service 52 performs local extension mobility logout at step 410.

Otherwise if the user is in the remote cluster, then at step 406, CCEM service 52 changes the device name of the phone on the remote cluster back to its original name (e.g., SEPC-CCxxxxxxxxx to SEPxxxxxxxxxxxx). At step 408, CCEM service 52 removes the temporary device from the user's home cluster. At step 410, CCEM service 52 performs local extension mobility logout for the user in the remote cluster.

After the user logs out from the phone, the phone restarts with the default configuration file stored in its call manager's database.

Alternatively, CCEM service 52 may allow users to log out automatically after a certain period of time has elapsed. The time value is configurable, as well as the ability for automatic logout.

Figure 5:
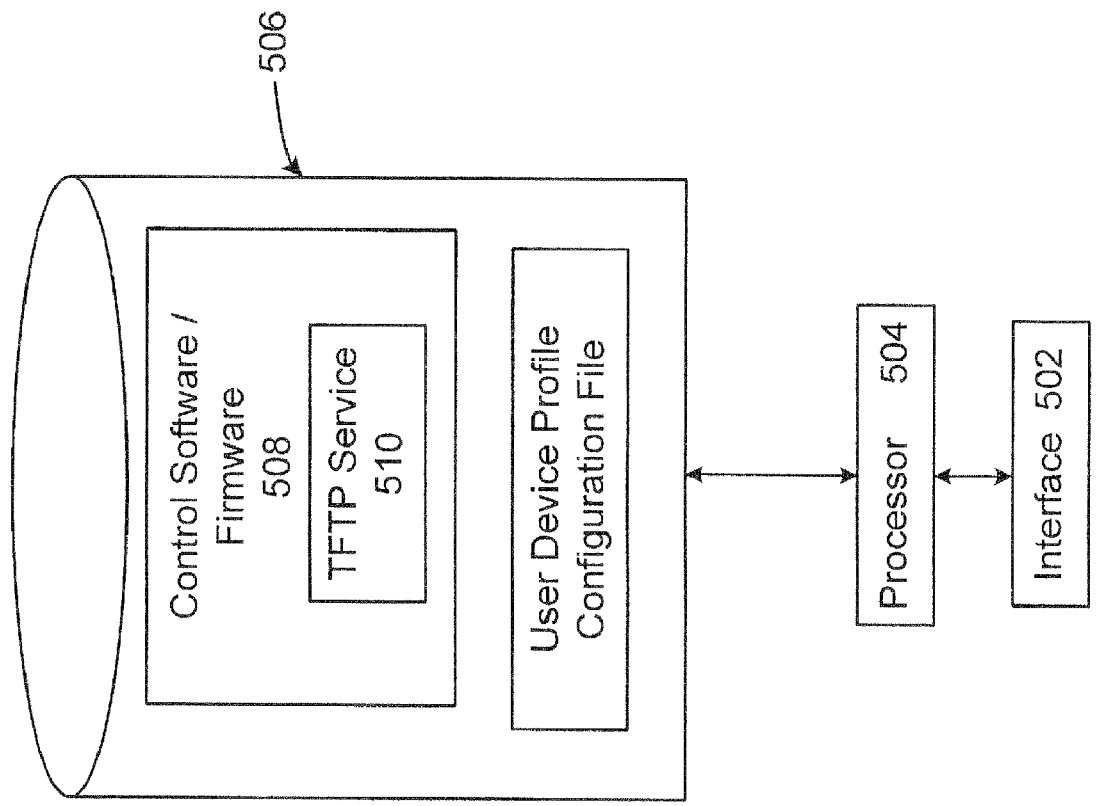
FIG. 5 is a block diagram illustrating an example call manager for CCEM in the example system of FIGS. 2A & 2B.

FIG. 5 is a block diagram illustrating an example call manager 500 for CCEM in the system of FIG. 2.

Referring to FIG. 5, call manager 500 includes a network interface 502 that receives data from and transmits data to a network (e.g., network 20 in FIG. 2). Network interface 502 is any electrical, physical, electromagnetic, or wireless connection enabling call manager 500 to be coupled to a network, such as network 20 in FIG. 2.

Call manager 500 also includes a processor 504 and a memory 506 that is accessible by processor 504. Memory 506 contains user's device profile, as well as configuration files for phones within the cluster. Memory 506 also contains telephony control software or firmware 508 that provides various telephony functions needed to control IP telephony devices. One such function is TFTP service 510. TFTP service parameters may be configured to accommodate file transfer between clusters. For example, the following configuration may be performed on Cisco Unified CallManager (CUCM) 4.2:

1) Under TFTP service Parameters (Advanced Settings):
   change 'Enable Caching of Configuration Files' to False;
   fill in the 'Alternate File Location X' with the \\IP_ADDR\TFTPPath for all other clusters in the network (X=1 to 10 & IP_ADDR=IP address of the TFTP servers in other clusters).

2) Restart TFTP on all servers.

Figure 6:
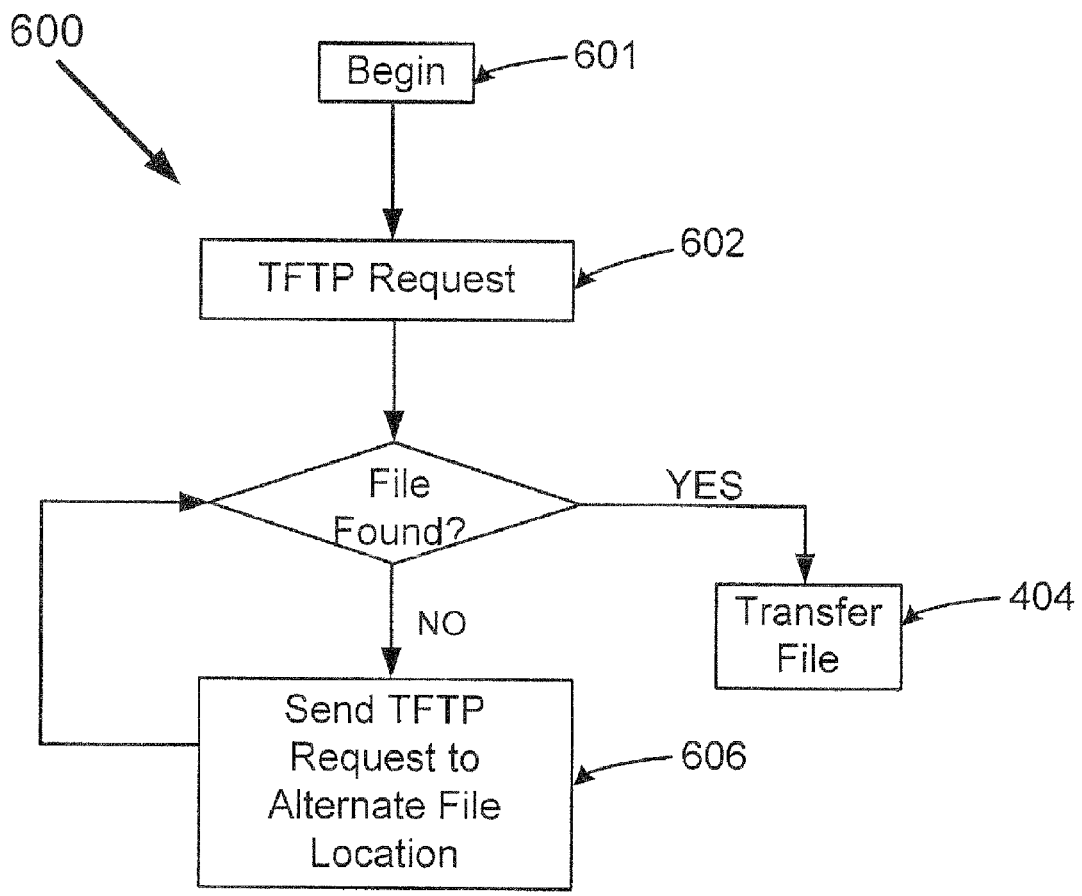
FIG. 6 is a flow chart illustrating an example method to transfer file between an IP telephony device and a call manager via Trivial File Transfer Protocol (TFTP) in the example system of FIGS. 2A & 2B.

FIG. 6 is a flow chart illustrating an example method 600 to transfer configuration file between an IP telephony device and a call manager via Trivial File Transfer Protocol (TFTP). As mention previously, the phone may be identified by its MAC address and/or other appropriate device name.

Method 600 begins at step 601. At step 602, the device contacts the local TFTP server in its home cluster for a particular file (e.g., device configuration file). If the file is found on device's local TFTP server, then the file is sent to the device at step 604. Otherwise, at step 606, the device will contact other TFTP servers for all other clusters until a match is found, e.g., based on the information contained in the "Alternate File Location X".

Figure 7:
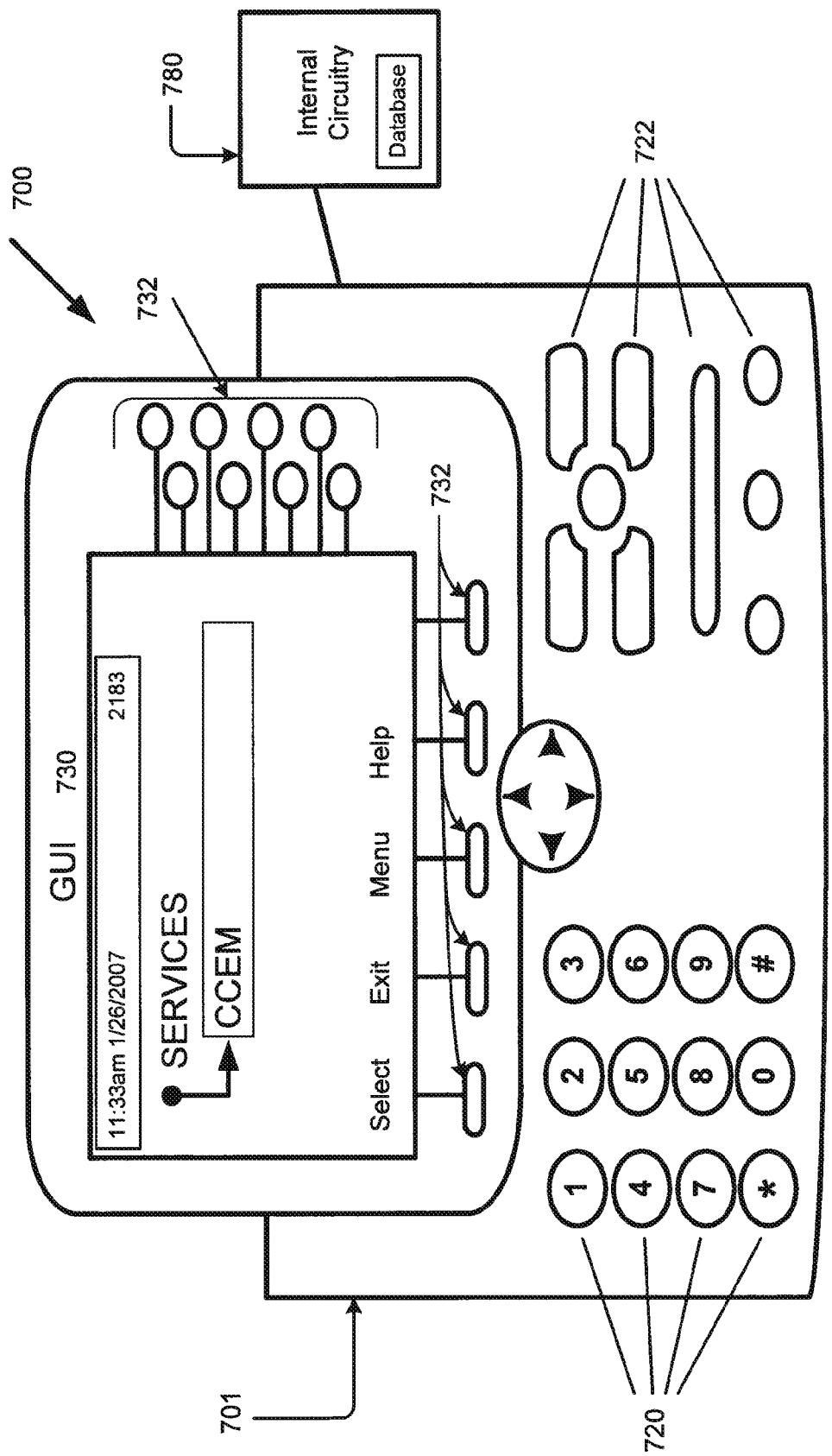
FIG. 7 is an example communication device for supporting CCEM in the example system of FIGS. 2A & 2B.

FIG. 7 depicts a communication device 700 in an example implementation for an IP telephony device to support CCEM, such as Cisco's 7960 phone. It should be appreciated that communication device 700 can be of a variety of implementations that is CCEM-enabled, e.g., a digital cellular telephone, an IP phone, a portable computer such as a laptop, a personal digital assistant, other device, apparatus, appliances, and the like.

Functionality of device 700 is provided with circuitry 780, which is internal to device 700 and isolated from the environment in which the device is deployed from contamination or user contact. Components of circuitry 780 and their effective interrelations are well known in the communicating, computing and related arts.

A user can, in various implementations, interface with circuitry 780 using one or more of several modalities. For example, familiar telephonic operation may be conducted using hard keys 720. Other operations, such as transferring a caller, placing a caller on hold, or selecting CCEM service, may be performed with keys 722 or through software based interface. For the purposes of this application, the term "button" means any type of switch, selection on a computer, or other user input used to indicate the selection of a particular feature of a communication device. Software based interface modalities for user interface with circuitry 780 comprises, a graphical user interface (GUI) 730 and the accompanying soft keys 732.

In an example implementation, the user can use hard keys 720 on device 700 to provide an input to circuitry 780 to invoke CCEM service. In another implementation, programmable soft keys 732 provided with GUI 730, allows the user to select CCEM service. In yet another implementation, the user can invoke CCEM service using a web interface.

Finally, those of skill in the art will appreciate that the method and system described and illustrated herein may be implemented in software, firmware or hardware, or any suitable combination thereof. Preferably, the method and system are implemented in software, for purposes of low cost and flexibility. Those of skill in the art will appreciate that the method and system may be implemented in logics encoded in one or more tangible media for execution in a machine. Alternative embodiments are contemplated and are within the spirit and scope of the following claims.

The invention claimed is:

1. A method to support cross cluster extension mobility (CCEM) in a communication network, which includes a plurality of clusters, each of the plurality of clusters including a call manager, the method comprising:
   receiving a request for cross cluster extension mobility from a user on a first telephony device located in a first cluster;
   adding a second telephony device in a home cluster for the user, only if the first cluster is different from the home cluster;
   performing extension mobility login for the user on the first telephony device; and
   configuring a Trivial File Transfer Protocol (TFTP) service parameter of the call manager in the first cluster.

2. The method of claim 1, in which receiving a request for cross cluster extension mobility from a user on a first telephony device located in a first cluster comprises receiving a user ID and a PIN from the user.

3. The method of claim 2, in which adding a second telephony device in a home cluster for the user comprises determining the home cluster using the user ID.

4. The method of claim 1, in which adding a second telephony device in a home cluster for the user comprises:
   creating a configuration file for the second telephony device;
   storing the configuration file in a local TFTP path of the call manager in the home cluster.

5. A method to support cross cluster extension mobility (CCEM) in a communication network, which includes a plurality of clusters, each of the plurality of clusters including a call manager, the method comprising:
   receiving a request for cross cluster extension mobility from a user on a first telephony device located in a first cluster;
   adding a second telephony device in a home cluster for the user, only if the first cluster is different from the home cluster, in which adding a second telephony device in a home cluster comprises:
      obtaining a Media Access Control (MAC) address and a phone type for the first telephony device;
      adopting a device name for the second telephony device, such that the device name of the second telephony device is the same as an original device name for the first telephony device; and
      replacing the original device name for the first telephony device with some other name;
   performing extension mobility login for the user on the first telephony device; and
   configuring a Trivial File Transfer Protocol (TFTP) service parameter of the call manager in the first cluster.

6. The method of claim 5, in which replacing the original device name for the first telephony device with some other name comprises replacing first three characters of the original device name for the first telephony device with 'CCC'.

7. The method of claim 1, in which configuring a TFTP service parameter of the call manager in the first cluster comprises:
   disabling caching of configuration files in the call manager;
   setting an alternate file location to include an IP address and a TFTP path for all other clusters in the communication network.

8. The method of claim 1, further comprising configuring the first telephony device and the second telephony device to support extension mobility.

9. The method of claim 1, further comprising performing extension mobility logout.

10. The method of claim 9, in which performing extension mobility logout comprises removing the second telephony device from the home cluster, if any.

11. The method of claim 10, in which removing the second telephony device from the home cluster comprises renaming the first telephony device by replacing a name for the first telephony device with a name for the second telephony device, the name for the second telephony device being an original name for the first telephony device.

12. A device, comprising:
   a connection to a first cluster in a communication network, the first cluster comprising a call manager;
   a connection to a home cluster in the communication network; and
   a cross cluster extension mobility (CCEM) service operable to:
      receive a request for cross cluster extension mobility from a user on a first telephony device located in the first cluster;
      add a second telephony device in the home cluster for the user, only if the first cluster is different from the home cluster;
      perform extension mobility login for the user on the first telephony device; and
      configure a TFTP service parameter of the call manager in the first cluster.

13. The device of claim 12, in which adding a second telephony device in the home cluster for the user comprises determining the home cluster using a user ID.

14. The device of claim 12, in which the CCEM service is operable to add the second telephony device in the home cluster by:
   obtaining a MAC address and a phone type for the first telephony device;
   adopting a device name for the second telephony device, such that the device name of the second telephony device is the same as an original device name for the first telephony device; and
   replacing the original device name for the first telephony device with some other name.

15. The device of claim 12, in which the CCEM service is operable to configure the TFTP service parameter of the call manager in the first cluster by:
   disabling caching of configuration files in the call manager in the first cluster;
   setting an alternate file location to include an IP address and a TFTP path for all other clusters in the communication network.

16. The device of claim 12, wherein the CCEM service is further operable to perform extension mobility logout.

17. The device of claim 16, in which the CCEM service is operable to perform extension mobility logout by removing the second telephony device from the home cluster.

18. A system for supporting cross cluster extension mobility (CCEM) in a communication network, which includes a plurality of clusters, each of the plurality of clusters including a call manager, the system comprising:
- a first telephony device in a first cluster, the first telephony device including:
  - a user interface operable to receive a user input; and
  - a network interface couple to the user interface and operable to communicate the user input over the communication network;
- an application server coupled to the communication network, the application server including:
  - a network interface operable to receive the user input from the first telephony device; and
  - a CCEM service application coupled to the network interface, the CCEM service application operable to perform extension mobility login for the user on the first telephony device and to add a second telephony device in a home cluster for the user, only if the first cluster is different from the home cluster, by:
    - obtaining a Media Access Control (MAC) address and a phone type for the first telephony device;
    - adopting a device name for the second telephony device, such that the device name of the second telephony device is the same as an original device name for the first telephony device; and
    - replacing the original device name for the first telephony device with some other name; and
- a call manager in the first cluster, the call manager including:
  - a network interface; and
  - a TFTP service, wherein the TFTP service is configurable to include an alternate file location for all other clusters in the communication network.

19. The system of claim 18, in which the first telephony device is further operable to support extension mobility.

20. The system of claim 18, in which the first telephony device is an IP phone.

21. The system of claim 18, in which the CCEM service application is further operable to perform cross cluster extension mobility logout.

* * * * *